Figure 1:
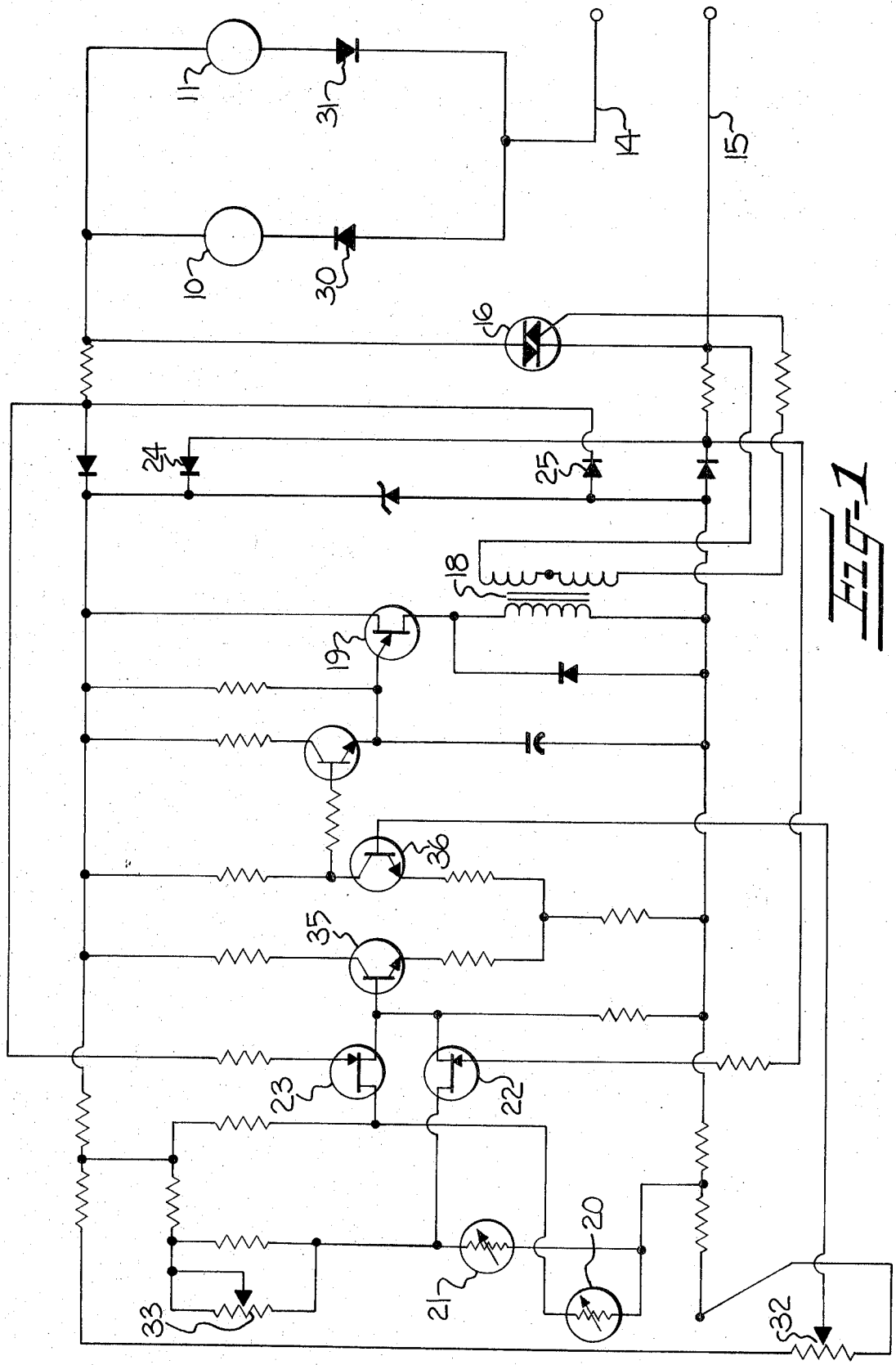

United States Patent [19]

Edge

[11] 3,854,033

[45] Dec. 10, 1974

[54] TIME SHARED CONTROL ARRANGEMENT FOR ELECTRICAL HEATERS AND METHOD

[76] Inventor: Harlan R. Edge, 227 Edgewood Dr., Greenville, S.C. 29605

[22] Filed: Apr. 17, 1972

(Under Rule 47)

[21] Appl. No.: 244,363

[52] U.S. Cl. .............................. 219/483, 219/497
[51] Int. Cl. ............................................ H05b 1/02
[58] Field of Search .......................... 219/483–486, 219/497

[56] References Cited
UNITED STATES PATENTS

| | | | |
|---|---|---|---|
| 3,431,399 | 3/1969 | Venning | 219/497 |
| 3,489,882 | 1/1970 | Krackow | 219/486 |
| 3,560,712 | 2/1971 | Toohill | 219/483 |

Primary Examiner—J. D. Miller
Assistant Examiner—Fred E. Bell
Attorney, Agent, or Firm—Bailey & Dority

[57] ABSTRACT

At least two electrical heaters are independently operated while a controller for the heaters is shared. Sharing of the controller occurs with independent sensing of the temperatures of the at least two heaters and delivery of successive cyclic portions of alternating current electrical power through the controller to successive ones of the heaters. During such delivery of power to the heaters, the controller responds independently during each successive cyclic portion to the sensed temperature of the corresponding one heater for thereby independently controlling the temperature of that one heater. Thus, the bulk and expense of control arrangements for multi-point heating applications is reduced.

18 Claims, 2 Drawing Figures

TIME SHARED CONTROL ARRANGEMENT FOR ELECTRICAL HEATERS AND METHOD

It is conventional in the use of electrical heaters to provide control arrangements for governing the temperatures reached by the electrical heaters. In many conventional processing applications, and most notably in certain textile manufacturing processes related to the production of synthetic yarns, it has become conventional to employ large numbers of electrical heaters in a single installation. By way of example, a single draw-twister frame will be equipped with a number of heaters used in simultaneously processing a number of ends of synthetic yarn. As will be understood, such a relatively large installation of electrical heaters has heretofore required a correspondingly large number of controllers, inasmuch as a one-to-one ratio of controllers and heaters has been required.

It is an object of the present invention to independently operate at least two electrical heaters while sharing a controller. In realizing this object of the present invention, the number of controllers required is significantly reduced. This reduction accomplishes a considerable saving in expense and space requirements while reducing the number of controllers which must be maintained in continuing operation of an installation.

A further object of the present invention is to operate a single controller and a plurality of electrical heaters together in such a manner that successive cyclic portions of alternating current electrical power are delivered through the controller to successive ones of the electrical heaters, while effecting response of the controller independently during each successive cyclic portion. In this manner, the response of the controller may vary as among the successive cyclic portions in order to accommodate varying heat loads placed upon the heaters to which electrical current is delivered through the single controller. In realizing this object of the present invention, the controller and plurality of heaters are operated in accordance with a method which provides for sensing the cyclic alternations of power delivered to the controller and independently sensing the temperatures of the plurality of heaters with which the controller cooperates.

Figure 2:
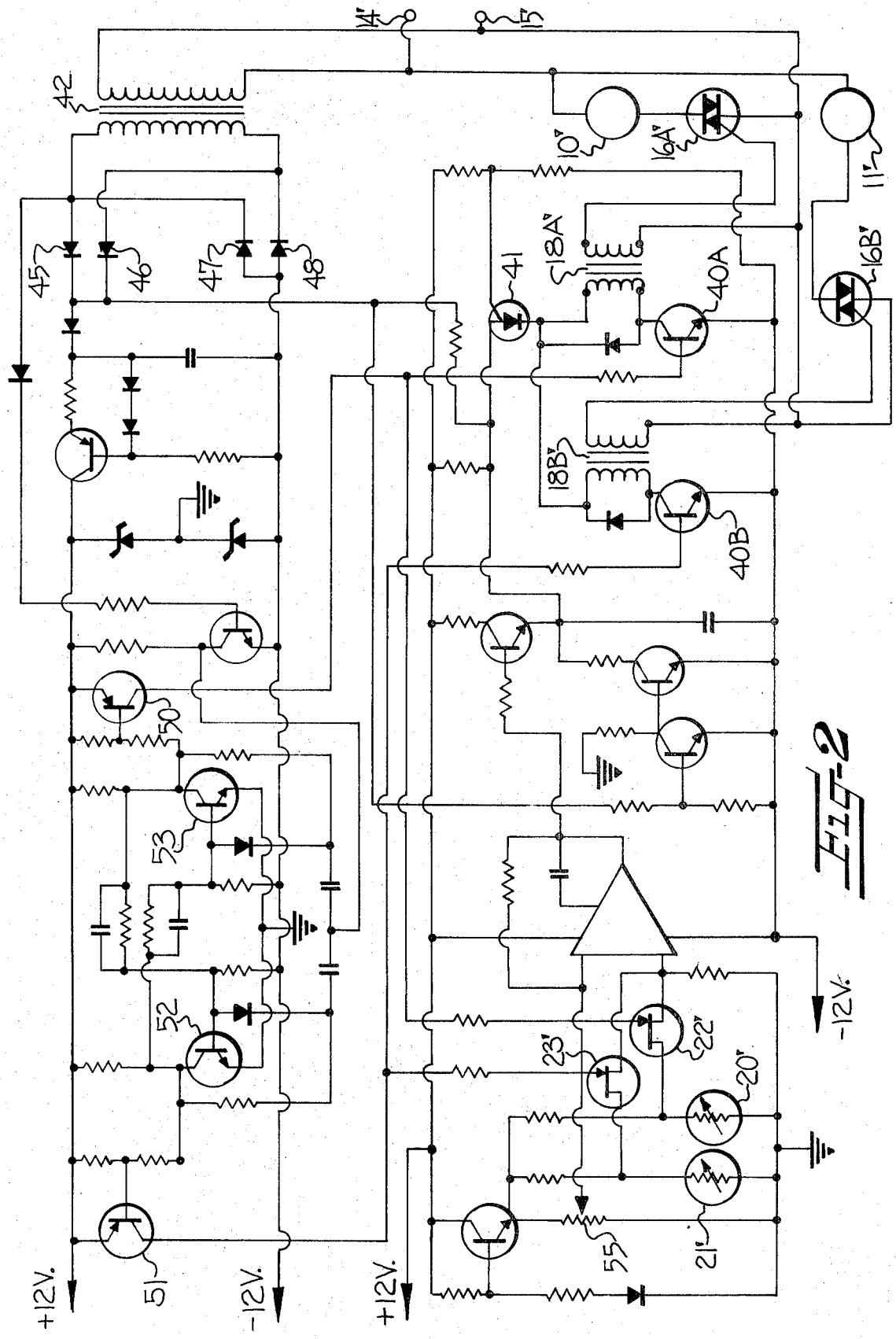

Some of the objects and advantages of the invention having been stated, others will appear as the description proceeds, when taken in connection with the accompanying drawings, in which:

FIG. 1 is a circuit diagram of the first embodiment for the combination of the present invention; and FIG. 2 is a circuit diagram of a second embodiment for the combination of the present invention.

Turning now to a more detailed disclosure of the present invention, reference will be had to the circuit diagrams set forth in FIGS. 1 and 2, particularly in the following disclosure of arrangements of apparatus in accordance with the present invention. At the outset, however, it is to be understood that the circuit diagrams and the following disclosure referred specifically thereto are included as illustrative and for the purpose of teaching preferred embodiments for the present invention, and not as limiting upon the broad utility contemplated for the apparatus and method of this invention.

In a first embodiment in accordance with the present invention, successive cyclic portions of electrical current are delivered to alternate ones of two electrical heaters 10, 11. In the diagram of FIG. 1, the heaters are represented simply as electrical loads, but it is to be understood that this first embodiment, as illustrated in FIG. 1, is particularly applicable for heaters which predominantly present a resistive load. Alternating current electrical power to be used in energizing the heaters 10, 11 is delivered into the arrangement of FIG. 1 through main lines 14, 15 which are operatively interconnected with a suitable source of such power, such as a 60 cycle line.

In accordance with the present invention, a controller is provided for selectively modifying at least one characteristic of electrical current delivered therethrough and thereby for controlling the average power delivered. In FIG. 1, the controller means includes a triac 16, which is a bi-directional triode thyristor of commercially available type capable of conducting current in either direction while exercising phase control over such alternating current electrical power. Such phase control is a process of rapid on-off switching in which the thyristor conducts a controlled fraction of each half-cycle of alternating current. This is a highly efficient means of controlling the average power delivered and is accomplished by governing the phase angle of the alternating current wave at which the thyristor is triggered. The thyristor will then conduct for the remainder of that half-cycle.

In this instance, triggering of the triac 16 into conduction is accomplished by a pulse applied to a pulse transformer 18 included in the controller of this invention and having a secondary winding connected to the gate of the triac 16. By means of a unijunction transistor 19, pulses are applied to the primary of the transformer 18 in particular phase relation to the alternating current electrical power supplied to input lines 14, 15.

In accordance with the present invention, independent temperature sensor means 20, 21 are provided and operatively associated with each of the electrical heaters 10, 11 for independently sensing the temperatures of the corresponding ones of the heaters. While the temperature sensor means preferably are variable resistance devices (as illustrated in FIG. 1) such that the resistance of the device varies with changes in temperature, it is contemplated that other known types of temperature sensor means may be employed where the effect on the sensor of a change in temperature is to vary an electrical characteristic of the sensor which may be sensed and used in controlling the alternating current electrical power controller.

In accordance with this invention, means are operatively interconnected with the unijunction transistor 19, transformer 18 and thyristor 16 of the power controller; with the electrical heaters 10, 11; and with the sensor means 20, 21 for sensing the cyclic alternations of the electrical current flowing to the controller through the main lines 14, 15. As will now be particularly disclosed, this means governs the delivery of successive cyclic portions of the electrical current through the controller to successive ones of the electrical heaters 10, 11 and effects response of the controller independently during each successive cyclic portion to the one of the temperature sensors 20, 21 which corresponds to the one electrical heater 10, 11 to which the corresponding cyclic portion of power is delivered. As a result, the temperature of the heaters 10, 11 is independently controlled.

In particular, the arrangement of FIG. 1 delivers alternate half-cycles of alternating current electrical power through alternate ones of the heaters 10, 11. Further, control of the unijunction transistor 19, and thus of the pulse transformer 18 and thyristor 16, is alternately switched between the two sensors 20, 21 by a pair of field effect transistors 22, 23 cooperating therewith. By means of sensing diodes 24, 25 operatively interconnected with the emitters of corresponding ones of the field effect transistor 22, 23, alternate ones of the field effect transistors 22, 23 conduct during alternate half-cycles or half-wave portions of the alternating current electrical power. Thus, during positive half-wave portions, the phase angle of conduction of the thyristor 16 is controlled by the resistance value of one of the sensors 20, 21 while during negative half-wave portions, the thyristor is controlled by the other of the sensors 20, 21.

In distinction to the active switching system employed for selection between the sensors 20, 21, selection between the loads 10, 11 is passive in the circuit of FIG. 1. Such passive selection is provided by diodes 30, 31 arranged in series with corresponding ones of two parallel connected electrical heaters 10, 11 for blocking successive half-wave portions of alternating electrical current from flowing through alternate ones of said electrical heaters. That is, during conduction through the thyristor 16 of a positive half-wave portion of alternating electrical current, such positive half-wave is conducted through one of the heaters 10, 11 by that one of the diodes 30, 31 which is conductive for positive half-waves. During conduction through the thyristor 16 of a negative half-wave portion, the other of the blocking diodes 30, 31 becomes conductive. The arrangement of the heaters 10, 11 with the sensors 20, 21 and blocking diodes 30, 31 is such that control as herein disclosed is accomplished. In an alternative arrangement (not shown), diodes are arranged to shunt corresponding ones of two series connected electrical heaters during respective positive and negative half-wave portions. The end result of these two variations is substantially the same.

The arrangement of the present invention may include either independent set-point means for establishing independently predetermined temperature set-points for each of the electrical heaters or a shared set-point means for establishing a single predetermined temperature set-point for the electrical heaters which share the controller. In the arrangement of FIG. 1, a single set-point means is provided by an adjustable resistance or potentiometer 32 operatively interconnected with the power controller. A balancing potentiometer 33 permits accommodation of the control arrangement of FIG. 1 to differences in circuit components so as to operate the heaters 10, 11 at the same temperatures. To further enlarge the number of electrical heaters operated at the same temperature, a single group-set-point control may be employed with a number of power controller circuits of the type herein disclosed with the addition of a transformer as 42 in FIG. 2, to provide isolation from the supply line.

The circuit of FIG. 1, as disclosed hereinabove, has particular utility with electrical heaters of the resistive type, which can readily accommodate operation with what is effectively a fluctuating direct current. It is contemplated by the present invention that operation with other types of electrical heating devices also be accommodated. An arrangement for accommodating such electrical heaters is illustrated in an alternate embodiment, disclosed in FIG. 2 and now to be described. In instances where elements of the arrangement of FIG. 2 correspond to elements described hereinabove with reference to FIG. 1, primed notation with similar reference characters has been employed.

The alternate arrangement of FIG. 2 differs from the arrangement of FIG. 1 in two important respects. First, the electrical heaters 10', 11' are of a type which predominantly present an inductive load, such as being transformer - coupled loads. Second, the successive cyclic portions delivered to the electrical heaters 10', 11' are successive full-wave portions of alternating current of electrical power. Control of this type is accomplished by duplication of the control thyristors, whereby separate thyristors 16A' and 16B' are provided for each of the electrical heaters 10', 11'. Each thyristor 16A', 16B' has a corresponding pulse transformer 18A', 18B'. By means of control transistors 40A, 40B, application of control pulses from a programable unijunction transistor 41 may be switched to alternate ones of the primaries of the pulse transformers 18A', 18B'. Thus, active switching of the power controller between the two electrical heaters 10', 11' is accomplished.

In the arrangement of FIG. 2, means are provided for responding to successive full-wave portions of alternating electrical current present on the main power line 14', 15'. In response to the sensed successive full-waves of alternating electrical current, switching is performed both for the sensors 20', 21' and for the thyristors 16A', 16B' and corresponding pulse transformers 18A', 18B'. More particularly, the alternation sensing and commutating means includes a transformer 42 operatively connected with the main power lines 14', 15' and delivering alternating current through a bridge arrangement of diodes 45, 46, 47, 48 to a circuit arrangement which controls the conduction of first and second switching transistors 50, 51. Each of the switching transistors 50, 51 is connected, by its base terminal, with circuitry including sensing transistors 52, 53 which conduct during alternate full cycles of alternating electrical current. The switching transistors 50, 51 are controlled in such a manner as to conduct during such alternate full cycles, and in turn control corresponding ones of the field effect transistors 22', 23' and pulse switching transistors 40A, 40B.

To further enlarge the number of electrical heaters operated at the same temperature, a single group set point control may be employed with a number of power controller circuits of the type herein disclosed.

While the above disclosure has proceeded with particular reference to circuit arrangements in which two electrical heaters are supplied, it is to be noted that the present invention contemplates supplying three or more electrical heaters in accordance with the arrangements and methods described hereinabove. In this type of control circuit, the flow of current to one of the heaters requires that all of the associated heaters be "turned off." For this reason, the heaters must be designed for a continuous wattage rating which is equal to the required watt load multiplied by the number of heaters sharing the same controller. For example, if 100 watts of heat is required at each position, the rating of each heater must be 200 watts at full line voltage if only two heaters share a controller, or 300 watts if three heaters share the same controller. If all of the shared heaters are to operate at the same temperature, then a single setpoint potentiometer may be employed. However, if different temperatures are required, separate set-point potentiometers may be used.

In the drawings and specification, there has been set forth a preferred embodiment of the invention, and although specific terms are employed, they are used in a generic and descriptive sense only and not for purposes of limitation.

That which is claimed is:

1. An arrangement for independently operating at least two electrical heaters while sharing a controller means and comprising:
   alternating current electrical power controller means for selectively modifying at least one characteristic of electrical current flowing therethrough and thereby for controlling the average power delivered,
   a plurality of electrical heaters,
   independent temperature sensor means operatively associated with each of said electrical heaters for independently sensing the temperatures of the corresponding ones of said heaters,
   means operatively interconnected with said controller means, said electrical heaters and said sensor means for sensing the cyclic alternations of the electrical current flowing through said controller means, means for delivering successive cyclic portions of the electrical current through said controller means to successive ones of said electrical heaters and means for effecting response of said controller means independently during each successive cyclic portion to the one of said independent temperature sensor means corresponding to the one electrical heater to which the one cyclic portion is delivered so as to independently control the temperature thereof.

2. The combination according to claim 1 wherein said electrical heaters comprise resistance means predominantly presenting a resistive load and further wherein said successive cyclic portions are successive half-wave portions of alternating current electrical power.

3. The combination according to claim 1 wherein said electrical heaters comprise inductive means predominantly presenting an inductive load and further wherein said successive cyclic portions are successive full-wave portions of alternating current electrical power.

4. The combination according to claim 1 wherein said controller means comprises thyristor means operatively connected to control conduction of electrical current through said controller means and triggering circuit means operatively connected with said thyristor means for varying the interval of each successive cycle portion of electrical current during which said thyristor means is conductive.

5. The combination according to claim 4 wherein said thyristor means comprises a plurality of thyristors each operatively connected for controlling conduction of electrical current through a corresponding one electrical heater.

6. An arrangement for independently operating at least two electrical heaters while sharing a controller means and comprising:
   alternating current electrical power controller means for selectively modifying at least one characteristic of electrical current flowing therethrough and thereby for controlling the average power delivered,
   a plurality of electrical heaters,
   independent temperature sensor means operatively associated with each of said electrical heaters,
   independent set-point means for establishing independently predetermined temperature set-points for each of said electrical heaters,
   means operatively interconnected with said controller means, said electrical heaters, said sensor means and said set-point means for sensing the cyclic alternations of the electrical current flowing through said controller means, means for successively commutating conduction of electrical power from the controller to successive ones of said electrical heaters in response to the sensed cyclic alternations of the power and means for independently controlling the power delivered to each one heater during such cyclic portion of the alternating electrical power as is conducted thereto in response to any difference between the corresponding set-point and sensed temperature.

7. The combination according to claim 6 wherein said electrical heaters are connected in parallel and said alternation sensing and commutating means includes half-wave sensor means for responding to successive half-wave portions of alternating electrical current and diode blocking means connected in series with said electrical heaters for blocking successive half-wave portions of alternating electrical current from flowing through alternate ones of said electrical heaters.

8. The combination according to claim 6 wherein said electrical heaters are connected in series and said alternation sensing and commutating means includes half-wave sensor means for responding to successive half-wave portions of alternating electrical current and diode shunt means connected in parallel with said electrical heaters for shunting successive half-wave portions of alternating electrical current across alternate ones of said electrical heaters.

9. The combination according to claim 6 wherein said alternation sensing and commutating means includes full-wave sensor means for responding to successive full-wave portions of alternating electrical current and switching circuit means operatively connected to said electrical heaters for conducting successive full-wave portions of alternating electrical current to alternate ones of said electrical heaters.

10. A method of independently operating at least two alternating current electrical heaters by sharing a controller delivering power thereto and comprising the steps of
   delivering alternating current electrical power to the controller while sensing the cyclic alternations of the power,
   independently sensing the temperatures of the at least two heaters,
   delivering successive cyclic portions of the alternating current electrical power through the controller to successive ones of the at least two heaters while responding independently during each successive cyclic portion to the sensed temperature of the corresponding one heater, and modulating at least one characteristic of the power delivered to the one heater for thereby independently controlling the temperature thereof.

11. A method according to claim 10 wherein successive half-wave cyclic portions of alternating current electrical power are delivered through the controller to successive ones of resistive electrical heaters.

12. A method according to claim 10 wherein successive full-wave cyclic portions of alternating current electrical power are delivered through the controller to successive ones of inductive electrical heaters.

13. A method according to claim 10 wherein alternating current electrical power is delivered to electrical heaters through at least one thyristor and further comprising the step of controllably varying the interval of each successive cyclic portion of alternating current electrical power during which power is delivered.

14. A method according to claim 13 wherein the controlled variation of power delivery intervals comprises successively delivering power through a plurality of thyristors to a corresponding plurality of electrical heaters.

15. A method of independently operating at least two alternating current electrical heaters by sharing a controller which is capable of responding to a sensed temperature condition by modifying at least one characteristic of power delivered therethrough to thereby bring the sensed temperature condition closer to a predetermined set-point, the method comprising the steps of:

delivering alternating current electrical power to the controller while sensing the cyclic alternations of the power, independently establishing predetermined setpoints for each of the at least two heaters, independently sensing the temperatures of each of the at least two heaters, and successively commutating conduction of electrical power from the controller to successive ones of the at least two heaters in response to the sensed cyclic alternations of the power and independently controlling the power delivered to each one heater during such cyclic portion of the alternating current electrical power as is conducted to the one heater from the controller.

16. A method according to claim 15 wherein the successive commutation of electrical power comprises responding to successive half-wave portions of alternating electrical current and blocking alternate half-wave portions from flow through alternate ones of the heaters.

17. A method according to claim 15 wherein the successive commutation of electrical power comprises responding to successive half-wave portions of alternating electrical current and shunting alternate half-wave portions across alternate ones of the heaters.

18. A method according to claim 15 wherein the successive commutation of electrical power comprises responding to successive full-wave portions of alternating electrical current and switching alternate full-wave portions to alternate ones of the heaters.

* * * * *